(12) United States Patent
Kim et al.

(10) Patent No.: US 11,067,844 B2
(45) Date of Patent: Jul. 20, 2021

(54) COLOR CONVERSION PANEL AND DISPLAY DEVICE INCLUDING THE SAME

(71) Applicant: Samsung Display Co., Ltd., Yongin-Si (KR)

(72) Inventors: Young Gu Kim, Yongin-si (KR); Jin-Soo Jung, Hwaseong-si (KR); Taek Joon Lee, Hwaseong-si (KR); Hye Lim Jang, Hwaseong-si (KR); Baek Kyun Jeon, Yongin-si (KR)

(73) Assignee: Samsung Display Co., Ltd.

( * ) Notice: Subject to any disclaimer, the term of this patent is extended or adjusted under 35 U.S.C. 154(b) by 762 days.

(21) Appl. No.: 15/676,615

(22) Filed: Aug. 14, 2017

(65) Prior Publication Data

US 2018/0188593 A1    Jul. 5, 2018

(30) Foreign Application Priority Data

Dec. 29, 2016 (KR) .................. 10-2016-0182312

(51) Int. Cl.
| | |
|---|---|
| *G02F 1/1335* | (2006.01) |
| *G02B 1/02* | (2006.01) |
| *G02B 5/20* | (2006.01) |
| *G02F 1/13357* | (2006.01) |
| *G02F 1/1368* | (2006.01) |

(52) U.S. Cl.
CPC ......... *G02F 1/133514* (2013.01); *G02B 1/02* (2013.01); *G02B 5/201* (2013.01); *G02F 1/133512* (2013.01); *G02F 1/133528* (2013.01); *G02F 1/133617* (2013.01); *G02F 1/1368* (2013.01); *G02F 1/133519* (2021.01); *G02F 1/133548* (2021.01); *G02F 2202/10* (2013.01); *G02F 2202/36* (2013.01)

(58) Field of Classification Search
CPC ......... G02F 1/133512; G02F 1/133519; G02F 1/133514; G02F 1/133528; G02F 1/133548; G02B 1/02; G02B 5/201
USPC .......................................... 359/891; 349/106
See application file for complete search history.

(56) References Cited

U.S. PATENT DOCUMENTS

| | | | |
|---|---|---|---|
| 6,608,439 B1 * | 8/2003 | Sokolik ................. | B82Y 20/00 |
| | | | 313/504 |
| 7,915,614 B2 * | 3/2011 | Shin .................. | G02F 1/136213 |
| | | | 257/532 |
| 9,952,740 B1 * | 4/2018 | Kim ........................ | G02B 5/20 |
| 10,451,914 B2 * | 10/2019 | Kim ................. | G02F 1/133528 |
| 10,509,253 B2 * | 12/2019 | Lee .................. | G02F 1/133512 |
| 2004/0051448 A1 * | 3/2004 | Matsumoto ............... | H01J 1/72 |
| | | | 313/506 |

(Continued)

FOREIGN PATENT DOCUMENTS

| | | |
|---|---|---|
| KR | 10-2006-0066271 A | 6/2006 |
| KR | 10-2016-0079695 A | 7/2006 |
| KR | 10-2016-0091497 A | 8/2016 |

*Primary Examiner* — Ricky D Shafer
(74) *Attorney, Agent, or Firm* — Innovation Counsel LLP

(57) ABSTRACT

A color conversion display panel includes a first color conversion layer and a second color conversion layer disposed on a color conversion substrate and including semiconductor nanocrystals, and a transmission layer, wherein a first distance between the first and second color conversion layers is different from a second distance between one of the first and second color conversion layers and the transmission layer.

20 Claims, 4 Drawing Sheets

(56) References Cited

U.S. PATENT DOCUMENTS

| | | | |
|---|---|---|---|
| 2008/0231779 A1* | 9/2008 | Shin | G02F 1/136213 |
| | | | 349/106 |
| 2010/0265605 A1* | 10/2010 | Lee | G02B 5/223 |
| | | | 359/891 |
| 2011/0102651 A1* | 5/2011 | Tay | H01L 27/14687 |
| | | | 348/280 |
| 2012/0019740 A1* | 1/2012 | Kadowaki | G02B 5/201 |
| | | | 349/61 |
| 2012/0287381 A1* | 11/2012 | Li | G02F 1/133509 |
| | | | 349/106 |
| 2013/0242228 A1* | 9/2013 | Park | G02F 1/133617 |
| | | | 349/61 |
| 2013/0335677 A1 | 12/2013 | You | |
| 2014/0160408 A1* | 6/2014 | Cho | G02F 1/133617 |
| | | | 349/110 |
| 2015/0009462 A1* | 1/2015 | Kozuka | G02F 1/133514 |
| | | | 349/107 |
| 2015/0194579 A1* | 7/2015 | Chung | H01L 33/24 |
| | | | 257/98 |
| 2017/0090247 A1* | 3/2017 | Lee | B82Y 30/00 |
| 2017/0179438 A1* | 6/2017 | Xu | H01L 27/322 |
| 2017/0192295 A1* | 7/2017 | Kim | G02F 1/133504 |

* cited by examiner

COLOR CONVERSION PANEL AND DISPLAY DEVICE INCLUDING THE SAME

CROSS-REFERENCE TO RELATED APPLICATION

This application claims priority to and the benefit of Korean Patent Application No. 10-2016-0182312 filed in the Korean Intellectual Property Office on Dec. 29, 2016, the disclosure of which is incorporated herein by reference in its entirety.

BACKGROUND (a) Field

The present disclosure relates to a color conversion display panel and a display device including the same.

(b) Description of the Related Art

A liquid crystal display used as a display device generally includes two field generating electrodes, a liquid crystal layer, a color filter, and a polarization layer. The polarization layer and the color filter of the display device may cause loss of light. Therefore, display devices including a color conversion display panel have been developed to realize a display device for reducing loss of light and enhancing color reproducibility.

The above information disclosed in this Background section is for enhancement of understanding of the background of the present disclosure and therefore it may contain information that does not form a prior art that is already known to a person of ordinary skill in the art.

SUMMARY

The present disclosure has been made in an effort to provide an overcoat layer covering a color conversion layer and a transmission layer and having a planar side, and a polarization layer disposed on the overcoat layer.

The present disclosure has been made in another effort to improve reliability and display quality of a color conversion display panel including the same, and a display device including the color conversion display panel.

The technical objects to be achieved by the present disclosure are not limited to the aforementioned technical objects, and other unmentioned technical objects will be obviously understood by those skilled in the art from the description below.

An exemplary embodiment of the present disclosure provides a color conversion display panel that includes a first color conversion layer and a second color conversion layer disposed on a color conversion substrate and including semiconductor nanocrystals, and a transmission layer, wherein a first distance between the first and second color conversion layers is different from a second distance between one of the first and second color conversion layers and the transmission layer.

The second distance may be less than the first distance.

The color conversion display panel may further include a blue light cutting filter disposed between the color conversion substrate and the first color conversion layer, and between the color conversion substrate and the second color conversion layer, wherein a first portion of the blue light cutting filter overlapping the first color conversion layer may be connected to a second portion of the blue light cutting filter overlapping the second color conversion layer.

A separation space between the first and second color conversion layers may include a first valley, a separation space between one of the first and second color conversion layers and the transmission layer may include a second valley, and a height of the first valley may be less than a height of the second valley.

A volume of the first valley may be 90% to 110% of a volume of the second valley.

A thickness of the first color conversion layer may be different from a thickness of the second color conversion layer.

A thickness of the blue light cutting filter overlapping the first color conversion layer may be different from a thickness of the blue light cutting filter overlapping the second color conversion layer.

The color conversion display panel may further include a light filter layer covering the first color conversion layer, the second color conversion layer, and the transmission layer.

The color conversion display panel may further include an overcoat layer covering the first color conversion layer, the second color conversion layer, and the transmission layer, and a polarization layer disposed on the overcoat layer.

The polarization layer may include a wire grid polarizer.

The overcoat layer may include at least one of acryl-based, polyimide-based, cardo-based, and siloxane-based compounds.

The color conversion display panel may further include a light blocking member disposed on the color conversion substrate, wherein a width of the light blocking member is greater than the first distance and the second distance.

Another embodiment of the present disclosure provides a display device including: a lower panel; and a color conversion display panel including a color conversion substrate overlapping the lower panel, wherein the color conversion display panel includes a first color conversion layer and a second color conversion layer disposed between the color conversion substrate and the lower panel and including semiconductor nanocrystals, and a transmission layer, and a first distance between the first and second color conversion layers is different from a second distance between one of the first and second color conversion layers and the transmission layer.

According to the exemplary embodiments, one side of the overcoat layer covering the color conversion layer and the transmission layer may be manufactured to be substantially planar. Further, the polarization layer may be formed on the overcoat layer in a seamless and stable manner. Accordingly, the reliability and the display quality of the color conversion display panel of the display device may be improved.

DETAILED DESCRIPTION OF THE EMBODIMENTS

Figure 1:
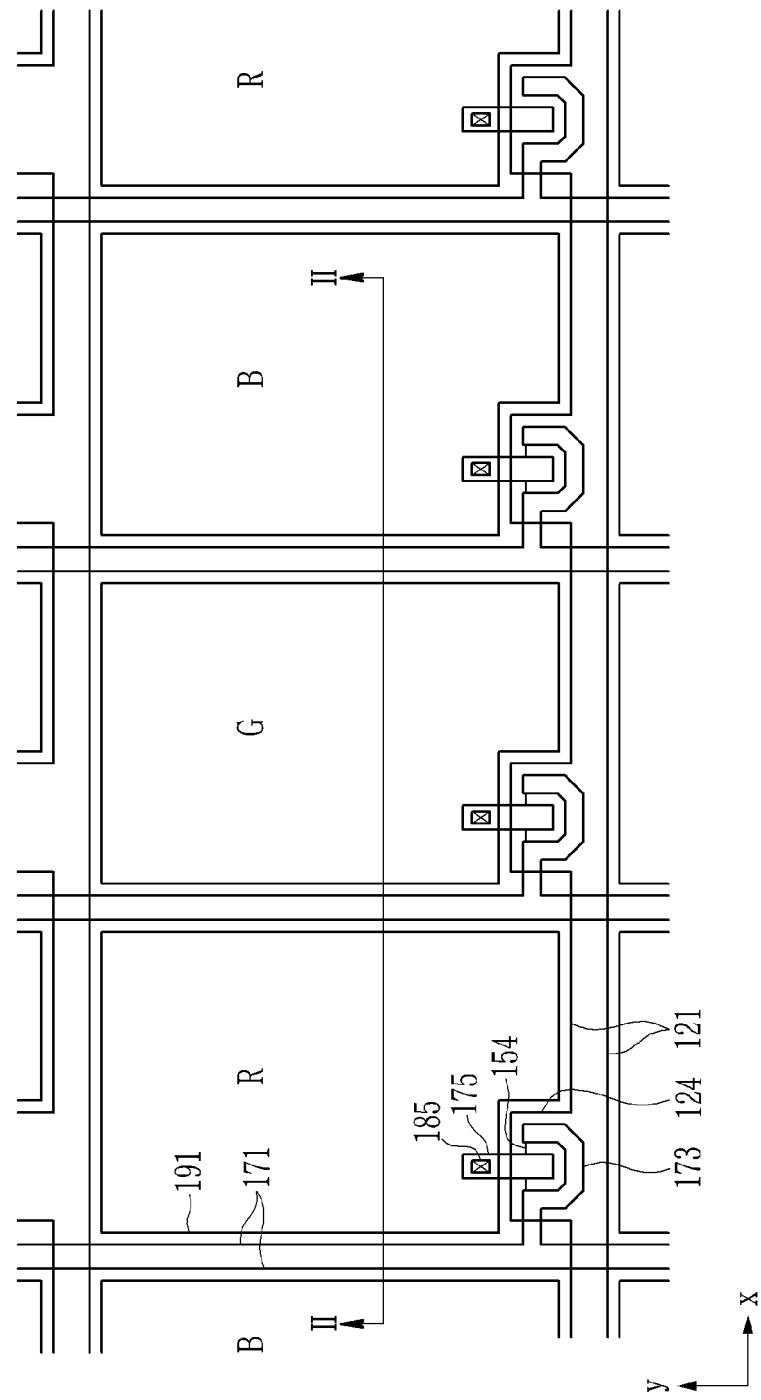
FIG. 1 shows a top plan view of a plurality of pixels according to an exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various ways without departing from the spirit or scope of the present disclosure.

To clearly describe the present disclosure, portions that do not relate to the description may be omitted, and like reference numerals designate like elements throughout the specification.

The size and thickness of each component shown in the drawings are arbitrarily shown for better understanding and ease of description, but the present disclosure is not limited thereto. In the drawings, the thickness of layers, films, panels, regions, etc. may be exaggerated for clarity. For better understanding and ease of description, the thickness of some layers and areas may also be exaggerated.

It will be understood that when an element such as a layer, film, region, or substrate is referred to as being "on" another element, it can be directly on the other element or one or more intervening elements may also be present. In contrast, when an element is referred to as being "directly on" another element, there may be no intervening elements present. The term "on" or "above" may mean being positioned on or below an object portion, and does not necessarily mean being positioned on the upper side of the object portion based on a gravitational direction.

Unless explicitly described to the contrary, the term "comprise" and variations such as "comprises" or "comprising" will be understood to imply an inclusion of stated elements but not an exclusion of any other elements.

The phrase "on a plane" means viewing an object portion from the top, and the phrase "on a cross-section" means viewing a cross-section of which the object portion is vertically cut from the side.

A display device according to an exemplary embodiment will now be described with reference to FIG. 1 and FIG. 2. FIG. 1 shows a top plan view of a plurality of pixels according to an exemplary embodiment of the present disclosure, and FIG. 2 shows a cross-sectional view with respect to a line II-II of FIG. 1.

Figure 2:
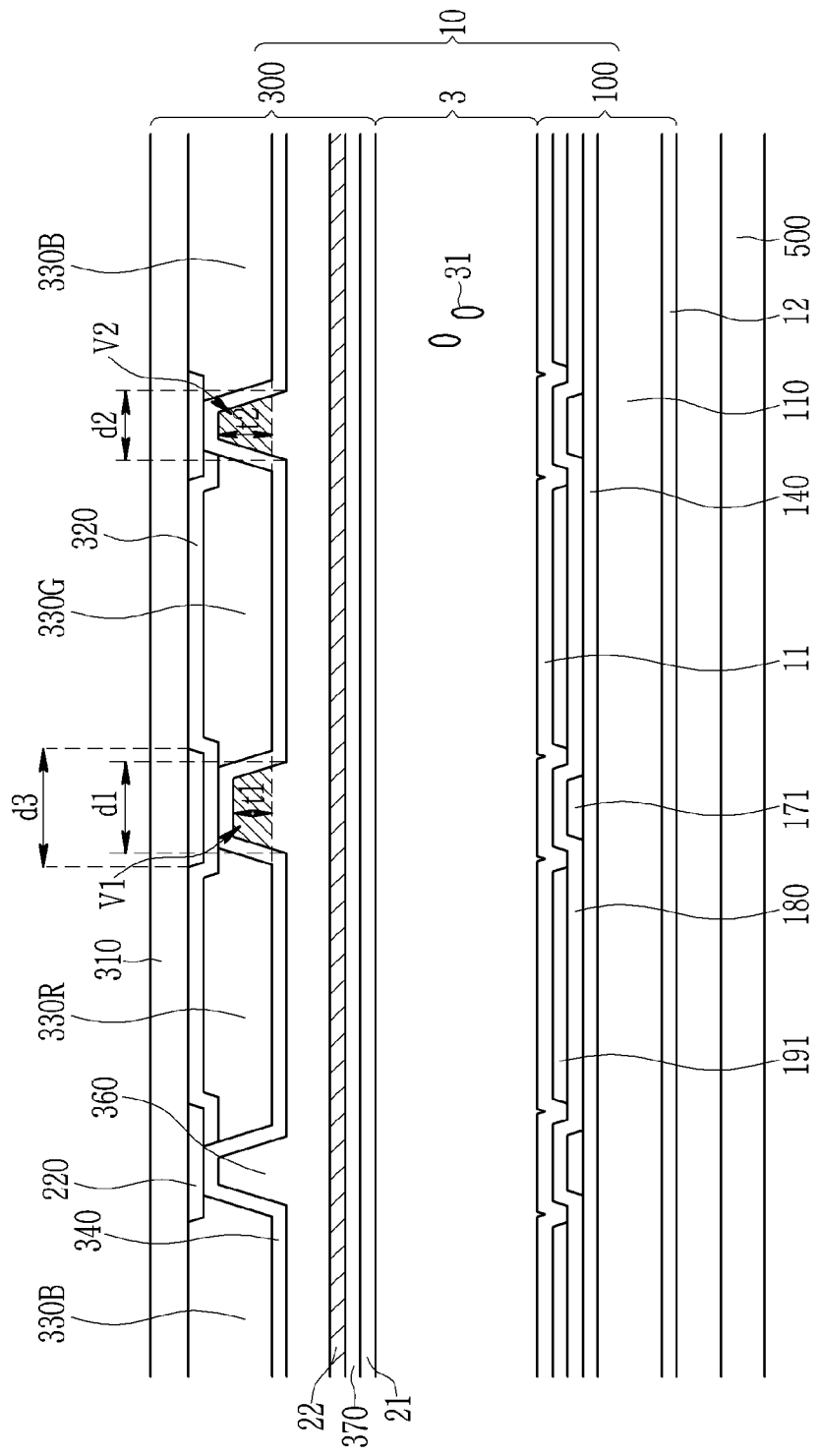
FIG. 2 shows a cross-sectional view with respect to a line II-II of FIG. 1.

Referring to FIG. 1 and FIG. 2, the display device includes a light unit 500 and a display panel 10 disposed on the light unit 500. The display panel 10 includes a lower panel 100, a color conversion display panel 300 separated from the lower panel 100 and disposed to face the same, and a liquid crystal layer 3 disposed between the lower panel 100 and the color conversion display panel 300.

The light unit 500 may include a light source (not shown) disposed on a rear side of the display panel 10 and generating light, and a light guide (not shown) for receiving the light and guiding the light in a direction toward the display panel 10. When the display panel 10 is an organic light emitting panel, the light unit 500 may be omitted.

The light unit 500 may include at least one light emitting diode (LED) which, for example, may be a blue light emitting diode (LED). The light source according to the example may be an edge type by which the light source is disposed on at least one side of a light guide (not shown), or a bottom type by which the light source of the light unit 500 is disposed at a bottom of a light guide (not shown), but the light source is not limited thereto.

The display panel 10 may include a liquid crystal panel (not shown) for forming a vertical electric field, and without being limited to this, it may be a display panel such as a liquid crystal panel for generating a horizontal electric field, a plasma display panel (PDP), an organic light emitting diode (OLED) display, a surface conduction electron-emitter display (SED), a field emission display (FED), a vacuum fluorescent display (VFD), or an E-paper. The display panel 10 forming a vertical electric field will now be described in detail.

The lower panel 100 is disposed between the liquid crystal layer 3 and the light unit 500.

The lower panel 100 includes a first polarization layer 12 disposed between a first substrate 110 and the light unit 500. The first polarization layer 12 polarizes light that is emitted from the light unit 500.

The first polarization layer 12 may use at least one of a deposition-type polarization layer, a coating-type polarization layer, and a wire grid polarization layer. The first polarization layer 12 may be disposed on one side of the first substrate 110. The first polarization layer may be of various types such as a film type, a deposition type, an attaching type, or a printing type.

A plurality of pixels is disposed in a matrix form on the first substrate 110. The first substrate 110 is disposed between the first polarization layer 12 and the liquid crystal layer 3.

A gate line 121 extending in an x direction and including a gate electrode 124, a gate insulating layer 140 disposed between the gate line 121 and the liquid crystal layer 3, a semiconductor layer 154 disposed between the gate insulating layer 140 and the liquid crystal layer 3, a data line 171 and a drain electrode 175 disposed between the semiconductor layer 154 and the liquid crystal layer 3, extending in a y direction, and connected to a source electrode 173, and a passivation layer 180 disposed between the data line 171 and the liquid crystal layer 3, may be disposed between the first substrate 110 and the liquid crystal layer 3.

A pixel electrode 191 is disposed on the passivation layer 180. The pixel electrode 191 may be physically and electrically connected to the drain electrode 175 through a contact hole 185 of the passivation layer 180.

A first alignment layer 11 may be disposed between the pixel electrode 191 and the liquid crystal layer 3.

The semiconductor layer 154 forms a channel layer on a portion that is not covered by the source electrode 173 and the drain electrode 175. The gate electrode 124, the semiconductor layer 154, the source electrode 173, and the drain electrode 175 configure a single thin film transistor.

The color conversion display panel 300 includes a color conversion substrate 310 overlapping the lower panel 100. A light blocking member 220 is disposed between the color conversion substrate 310 and the liquid crystal layer 3.

The light blocking member 220 may be disposed to overlap valleys V1 and V2 formed between a first color conversion layer 330R and a second color conversion layer 330G, between the second color conversion layer 330G and a transmission layer 330B, and between the transmission layer 330B and the first color conversion layer 330R to be described. The light blocking member 220 may partition a region in which the first color conversion layer 330R, the second color conversion layer 330G, and the transmission layer 330B are disposed.

An x-directional width d3 of the light blocking member 220 may be greater than gaps between the color conversion layers 330R and 330G, and between the color conversion layer 330G and the transmission layer 330B that are respectively referred to as a width d1 of the first valley V1 and a width d2 of the second valley V2.

According to an exemplary embodiment, the gaps among the first color conversion layer 330R, the second color conversion layer 330G, and the transmission layer 330B may be different. When the gaps among the first color conversion layer 330R, the second color conversion layer 330G, and the transmission layer 330B are different, a user may sense differences of image quality.

However, the light blocking member 220 according to an exemplary embodiment of the present disclosure has the width d3 that is greater than the gaps among the first color conversion layer 330R, the second color conversion layer 330G, and the transmission layer 330B. Accordingly, the gaps between the first color conversion layer 330R and the second color conversion layer 330G, between the second color conversion layer 330G and the transmission layer 330B, and between the transmission layer 330B and the first color conversion layer 330R may not be different from a viewpoint of the user. Therefore, the differences of image quality of respective colors realized by the display device may be reduced.

The example of FIG. 2 shows that the light blocking member 220 is disposed on the color conversion display panel 300, but the present disclosure is not limited thereto, and the light blocking member 220 may be disposed on the lower panel 100.

A blue light cutting filter 320 is disposed on the color conversion substrate 310 and the light blocking member 220.

The blue light cutting filter 320 is disposed to overlap regions outputting red and green light, and is not disposed in a region outputting blue light. The blue light cutting filter 320 may include an opening overlapping the region outputting blue light.

The blue light cutting filter 320 includes a region overlapping the first color conversion layer 330R and a region overlapping the second color conversion layer 330G, and the regions may be connected to each other. The blue light cutting filter 320 may further include a region overlapping the first valley V1 disposed between the first color conversion layer 330R and the second color conversion layer 330G.

The blue light cutting filter 320 transmits the light with a wavelength except a blue wavelength band, and blocks the light of the blue wavelength band. The blue light cutting filter 320 may include any kind of material for performing the above-described effect, and for example, it may be a yellow color filter.

The example of FIG. 2 shows that the blue light cutting filter 320 contacts the color conversion substrate 310. However, the present disclosure is not limited thereto. The display device may further include a buffer layer disposed between the blue light cutting filter 320 and the color conversion substrate 310.

A plurality of color conversion layers 330R and 330G may be disposed between the blue light cutting filter 320 and the liquid crystal layer 3, and the transmission layer 330B may be disposed between the color conversion substrate 310 and the liquid crystal layer 3.

A plurality of color conversion layers 330R and 330G may convert the incident light into light having a different wavelength from that of the incident light. A plurality of color conversion layers 330R and 330G may include a first color conversion layer 330R and a second color conversion layer 330G, the first color conversion layer 330R may be a red color conversion layer, and the second color conversion layer 330G may be a green color conversion layer. The transmission layer 330B may output the light without color conversion, and for example, it may receive blue light and may output blue light.

A first valley V1 may be disposed between the adjacent first color conversion layer 330R and second color conversion layer 330G, and a second valley V2 may be disposed between the adjacent second color conversion layer 330G and transmission layer 330B or between the adjacent first color conversion layer 330R and transmission layer 330B.

According to an exemplary embodiment, a first distance d1 between the first color conversion layer 330R and the second color conversion layer 330G may be different from a second distance d2 between the second color conversion layer 330G and the transmission layer 330B or a second distance d2 between the first color conversion layer 330R and the transmission layer 330B. A width d1 of the first valley V1 disposed between the first color conversion layer 330R and the second color conversion layer 330G may be greater than a width d2 of the second valley V2 disposed between the second color conversion layer 330G and the transmission layer 330B or between the first color conversion layer 330R and the transmission layer 330B.

Further, a first height t1 of the first valley V1 may be less than a second height t2 of the second valley V2. The first height t1 may be a distance of one side of the first color conversion layer 330R or the second color conversion layer 330G from one side of a light filter layer 340 disposed between the first color conversion layer 330R and the second color conversion layer 330G. Further, the second height t2 may be a distance of one side of the transmission layer 330B from one side of the light filter layer 340 disposed between the second color conversion layer 330G and the transmission layer 330B. The first height t1 may be less than the second height t2 by a thickness of the blue light cutting filter 320.

The first valley V1 may be shorter and wider than the second valley V2. The second valley V2 may be taller and narrower than the first valley V1. The first valley V1 and second valley V2 may have substantially the same volume, and for example, the volume of the first valley V1 may be 90% to 110% of the volume of the second valley V2.

In addition to the above-described gaps between the color conversion layers 330R and 330G and the transmission layer 330B, and the heights of the first valley V1 and the second valley V2, the flatness of one side of an overcoat layer 360, particularly one side disposed toward the liquid crystal layer 3, may be improved as will be described below.

The first color conversion layer 330R may include semiconductor nanocrystals for converting incident blue light into red light. The semiconductor nanocrystals may include at least one of a phosphor and a quantum dot.

When the first color conversion layer 330R includes a red phosphor, the red phosphor may be one material of (Ca, Sr, Ba)S, (Ca, Sr, Ba)$_2$Si$_5$N$_8$, CaAlSiN$_3$, CaMoO$_4$, and Eu$_2$Si$_5$N$_8$, but the present disclosure is not limited thereto. The first color conversion layer 330R may include at least one kind of red phosphor.

The second color conversion layer 330G may include semiconductor nanocrystals for converting incident blue light into green light. The semiconductor nanocrystals may include at least one of a phosphor and a quantum dot.

When the second color conversion layer 330G includes a green phosphor, the green phosphor may be one of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$, and the present disclosure is not limited thereto. The second color conversion layer 330G may include at least one kind of green phosphor. Here, the x may be any number between 0 and 1.

The first color conversion layer 330R and the second color conversion layer 330G may include a quantum dot for converting the color, instead of the phosphor. The quantum dot may be selected from a Group II-VI compound, a Group III-V compound, a Group IV-VI compound, a Group IV element, a Group IV compound, and a combination thereof.

The Group II-VI compound may include a binary compound selected from the group consisting of CdSe, CdTe, ZnS, ZnSe, ZnTe, ZnO, HgS, HgSe, HgTe, MgSe, MgS, and a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may include a binary compound selected from the group consisting of GaN, GaP, GaAs, GaSb, AlN, AlP, AlAs, AlSb, InN, InP, InAs, InSb, and a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound include a binary compound selected from the group consisting of SnS, SnSe, SnTe, PbS, PbSe, PbTe, and a mixture thereof; a tertiary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the tertiary compound, or the quaternary compound may exist in particles at a uniform concentration, or may exist in the same particle divided into states where concentration distributions may partially differ. Further, each of the color conversion layers 330R and 330G may have a core/shell structure where one quantum dot surrounds another quantum dot. An interface between the core and the shell may have a concentration gradient, such that a concentration of an element existing in the shell is gradually reduced nearing the center thereof.

The quantum dot may have a full width at half maximum (FWHM) of an emission wavelength spectrum of about 45 nm or less, preferably about 40 nm or less, and more preferably about 30 nm or less, and in this range, color purity or color reproducibility may be improved. Also, the light emitted through the quantum dot is irradiated in all directions, thereby improving a light viewing angle.

Further, the form of the quantum dot is one generally used in the art and is not particularly limited, and more specifically, the quantum dot may be formed to be spherical, pyramidal, multi-armed, or cubic nanoparticles, nanotubes, nanowires, nanofibers, and nanoplate-shaped particles.

The transmission layer 330B may include a resin for transmitting incident blue light. The transmission layer 330B disposed in a blue light outputting region does not include an additional semiconductor nanocrystal and transmits the incident blue light.

Although not explicitly shown in FIG. 2, the transmission layer 330B may include at least one of a dye and a pigment according to an exemplary embodiment.

In one embodiment, each of the first color conversion layer 330R, the second color conversion layer 330G, and the transmission layer 330B may include a photosensitive resin that is manufactured through a photolithography process. In another embodiment, photosensitive resin may be manufactured through a printing process, and when printing process is used, the first color conversion layer 330R, the second color conversion layer 330G, and the transmission layer 330B may include another material that is not a photosensitive resin. It is noted that the manufacturing process of the color conversion layer and the transmission layer may not be limited to the photolithography process or the printing process.

At least one of the first color conversion layer 330R, the second color conversion layer 330G, and the transmission layer 330B may include a scatterer (not shown). For example, the first color conversion layer 330R, the second color conversion layer 330G, and the transmission layer 330B may respectively include a scatterer. In another example, the transmission layer 330B may include a scatterer while the first color conversion layer 330R and the second color conversion layer 330G may include no scatterer. Further, amounts of the scatterers included by the first color conversion layer 330R, the second color conversion layer 330G, and/or the transmission layer 330B may be different.

The scatterer may include any material that can evenly scatter incident light, and for example, may include one of $TiO_2$, $ZrO_2$, $Al_2O_3$, $In_2O_3$, ZnO, $SnO_2$, $Sb_2O_3$, and ITO.

The light filter layer 340 may be disposed between the color conversion layers 330R and 330G, the transmission layer 330B, and the liquid crystal layer 3. A width of the light filter layer 340 overlapping the first valley V1 may be greater than a width of the light filter layer 340 overlapping the second valley V2.

The light filter layer 340 may be a filter that prevents damage and quenching of the phosphor or the quantum dots included by the first color conversion layer 330R and the second color conversion layer 330G during one or more high temperature processes after the first color conversion layer 330R, the second color conversion layer 330G, and the transmission layer 330B are formed. The filter may transmit light of a predetermined wavelength and may reflect or absorb light other than that of the predetermined wavelength.

The light filter layer 340 may include a structure in which inorganic layers having a high refractive index and inorganic layers having a low refractive index are alternately stacked about 10 to 20 times. That is, the light filter layer 340 may have a structure in which a plurality of layers with different refractive indices are stacked. In this instance, the light filter layer 340 may reflect or absorb light of a specific wavelength. The light filter layer 340 may transmit or/and reflect the light of the specific wavelength by using reinforcement interference and/or destructive interference between the inorganic film having a high refractive index and the inorganic film having a low refractive index.

The light filter layer 340 may include at least one of $TiO_2$, $SiN_x$, $SiO_y$, TiN, AlN, $Al_2O_3$, $SnO_2$, $WO_3$, and $ZrO_2$, and for example, the light filter layer 340 may be a structure in which $SiN_x$ and $SiO_y$ are alternately stacked. Regarding the $SiN_x$ and $SiO_y$, x and y are factors for determining a chemical composition ratio, and are controllable by a processing condition for forming the light filter layer 340.

The overcoat layer 360 is disposed between the light filter layer 340 and the liquid crystal layer 3. The overcoat layer 360 planarizes one sides of a plurality of color conversion layers 330R and 330G and the transmission layer 330B.

The overcoat layer 360 may include an organic material. For example, the overcoat layer 360 may include at least one of acryl-based, polyimide-based, cardo-based, and siloxane-based compounds, but the present disclosure is not limited thereto.

A substantially same amount of an overcoat material for forming the overcoat layer 360 may be disposed to the first valley V1 and the second valley V2. A volume of the overcoat layer 360 filling the first valley V1 may be substantially the same as a volume of the overcoat layer 360 filling the second valley V2. For example, the volume of the overcoat layer 360 filling the first valley V1 may be 90% to 110% of the volume of the overcoat layer 360 filling the second valley V2.

The width and the height of the overcoat layer 360 filling the first valley V1 are different from those of the overcoat layer 360 filling the second valley V2. However, the overcoat layer 360 filling the first valley V1 and the overcoat layer 360 filling the second valley V2 may have substantially the same volume. Therefore, it is possible to provide the overcoat layer 360 with one substantially flat side in the process for filling the overcoat material in the first valley V1 and the second valley V2.

A second polarization layer 22 is disposed between the overcoat layer 360 and the liquid crystal layer 3. The second polarization layer 22 may be disposed on the one flat side of the overcoat layer 360.

At least one of an applying-type polarization layer, a coating-type polarization layer, and a wire grid polarizer is usable for the second polarization layer 22, and for example, the second polarization layer 22 may be a wire grid polarizer including a metal pattern. The second polarization layer 22 may be disposed between the overcoat layer 360 and the liquid crystal layer 3. The second polarization layer 22 may be of various types such as a film type, an applying type, an attaching type, or a printing type. In this instance, the side of the overcoat layer 360 on which the second polarization layer 22 is formed is planar so the second polarization layer 22 may be formed in a stable manner.

A common electrode 370 is disposed between the second polarization layer 22 and the liquid crystal layer 3. Although not shown in the example shown in FIG. 2, when the second polarization layer 22 is made of a metal, an insulating layer (not shown) may be disposed between the common electrode 370 and the second polarization layer 22.

The common electrode 370 receiving a common voltage forms an electric field with the pixel electrode 191 to arrange a plurality of liquid crystal molecules 31 disposed on the liquid crystal layer 3.

A second alignment layer 21 is disposed between the common electrode 370 and the liquid crystal layer 3. The liquid crystal layer 3 includes a plurality of liquid crystal molecules 31, and the alignment direction of the liquid crystal molecules 31 is controlled by the electric field between the pixel electrode 191 and the common electrode 370. An image may be displayed by controlling transmittance of light emitted from the light unit 500 according to the alignment direction of the liquid crystal molecules 31.

The display device according to an exemplary embodiment may include an overcoat layer 360 having one flat side through a change of a gap between a plurality of color conversion layers 330R and 330G and a transmission layer 330B. Accordingly, the second polarization layer 22 disposed on one side of the overcoat layer 360 may be formed in a stable manner, and the reliability of the display device may be improved.

Figure 3:
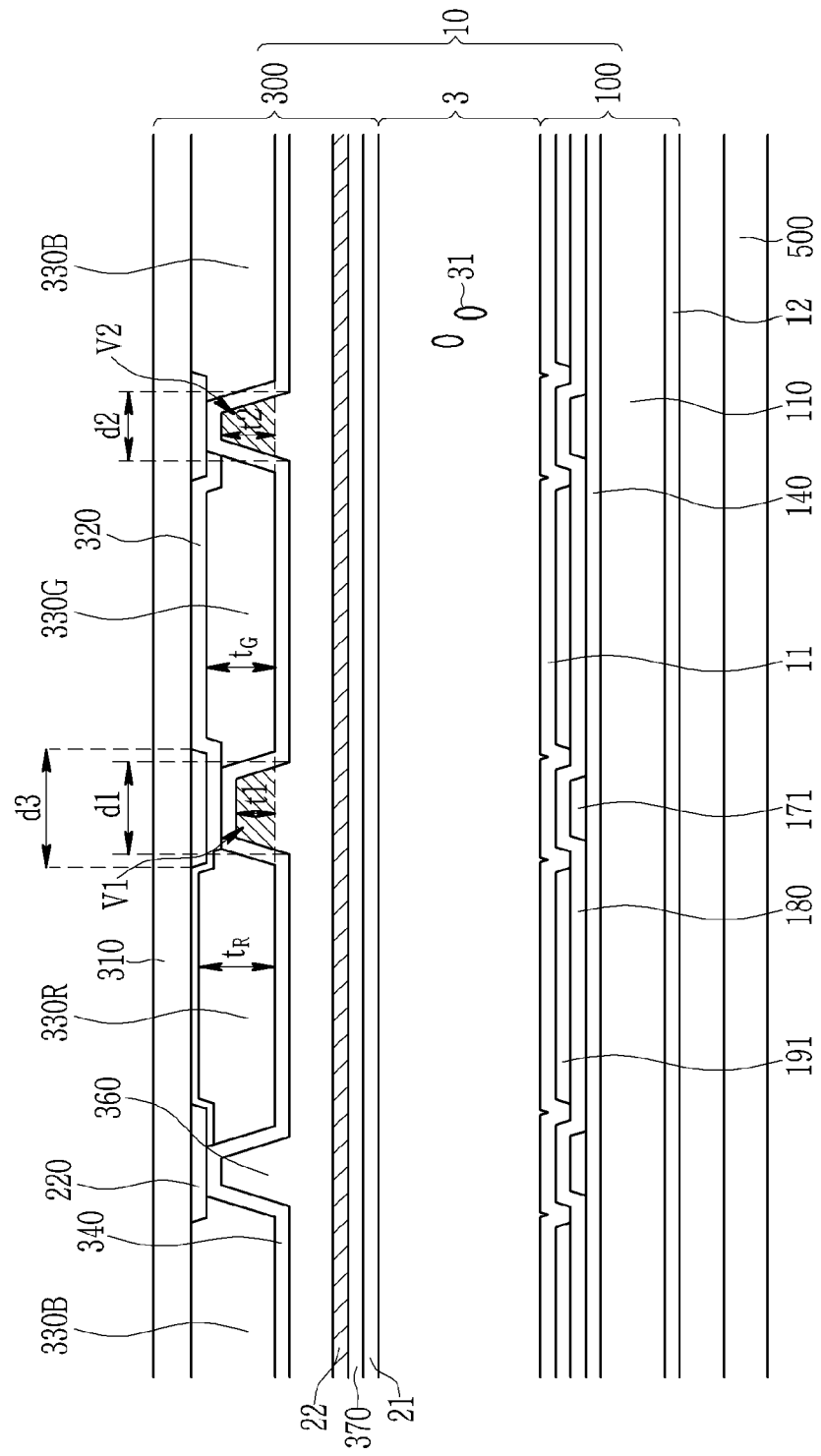
FIG. 3 and FIG. 4 show cross-sectional views according to varied exemplary embodiments of FIG. 2.
Figure 4:
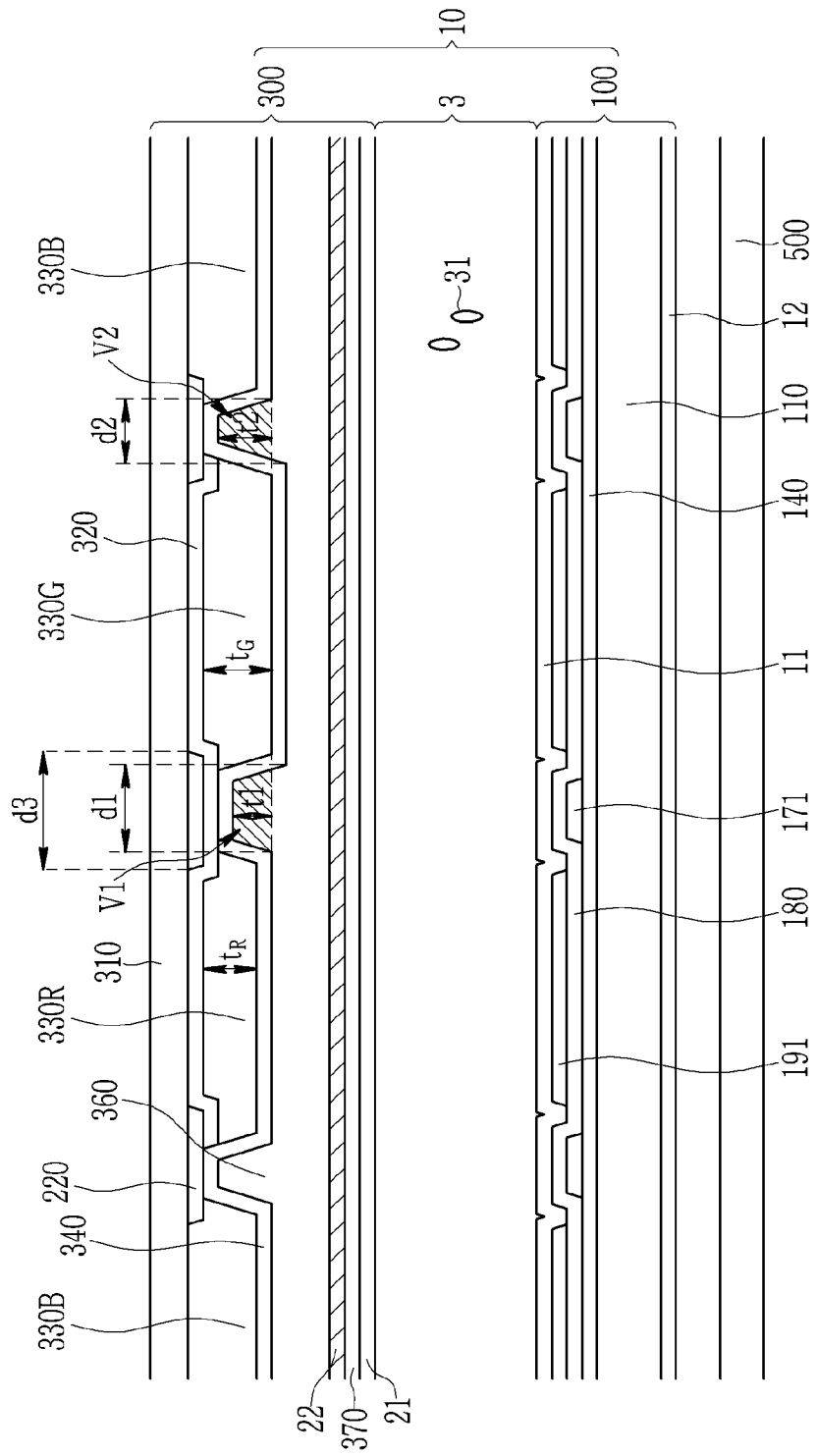

A display device according to an exemplary embodiment will now be described with reference to FIG. 3 and FIG. 4. FIG. 3 and FIG. 4 show cross-sectional views according to varied exemplary embodiments of FIG. 2. Detailed descriptions of the same or similar constituent elements as the above-described constituent elements may be omitted.

Referring to FIG. 3, the display device may include a light unit 500 and a display panel 10. The light unit 500 may be disposed on a rear side of the display panel 10.

The display panel 10 includes a lower panel 100, a color conversion display panel 300 facing the lower panel 100 and separated therefrom, and a liquid crystal layer 3 disposed between the lower panel 100 and the color conversion display panel 300.

The color conversion display panel 300 includes a color conversion substrate 310. A light blocking member 220 and a blue light cutting filter 320 may be disposed between the color conversion substrate 310 and the liquid crystal layer 3.

The blue light cutting filter 320 may have different thicknesses at a red light outputting region and a green light outputting region. A thickness of the blue light cutting filter 320 overlapping the first color conversion layer 330R may be different from a thickness of the blue light cutting filter 320 overlapping the second color conversion layer 330G. For example, a thickness of one blue light cutting filter 320 overlapping the first color conversion layer 330R may be greater than a thickness of the blue light cutting filter 320 overlapping the second color conversion layer 330G.

The example of FIG. 3 shows that a portion of the blue light cutting filter 320 overlapping the red light outputting region is thinner than the blue light cutting filter 320 overlapping the green light outputting region. However, the present disclosure is not limited thereto. For example, the blue light cutting filter 320 overlapping the red light outputting region may be thicker than the blue light cutting filter 320 overlapping the green light outputting region. According to an exemplary embodiment, the blue light cutting filter 320 may include at least two regions with different thicknesses.

A plurality of color conversion layers 330R and 330G may be disposed between the blue light cutting filter 320 and the liquid crystal layer 3, and the transmission layer 330B may be disposed between the color conversion substrate 310 and the liquid crystal layer 3.

A plurality of color conversion layers 330R and 330G may include a first color conversion layer 330R and a second color conversion layer 330G. The first color conversion layer 330R may be a red color conversion layer, and the second color conversion layer 330G may be a green color conversion layer.

In the present exemplary embodiment, the first color conversion layer 330R and the second color conversion layer 330G may have different thicknesses. For example, the example of FIG. 3 shows that a thickness ($t_R$) of the first color conversion layer 330R is greater than a thickness ($t_G$) of the second color conversion layer 330G. However, the present disclosure is not limited thereto. For example, a thickness of the second color conversion layer 330G may be greater than a thickness of the first color conversion layer 330R. As the thickness of the color conversion layer becomes greater, a greater amount of light may be output.

To summarize the exemplary embodiment shown in the present disclosure, a thickness of the blue light cutting filter 320 disposed in the red light outputting region may be less than a thickness of the blue light cutting filter 320 disposed in the green light outputting region. Correspondingly, a thickness of the first color conversion layer 330R may be greater than a thickness of the second color conversion layer 330G, and the first color conversion layer 330R may provide a greater amount of red light than the second color conversion layer 330G.

Further, although not shown in the present disclosure, an opposite case to the above-described exemplary embodiment is allowable. A thickness of the blue light cutting filter 320 disposed in the green light outputting region may be less than a thickness of the blue light cutting filter 320 disposed in the red light outputting region, and correspondingly, a thickness of the second color conversion layer 330G may be greater than a thickness of the first color conversion layer 330R, and the second color conversion layer 330G provides a greater amount of green light than the first color conversion layer 330R is possible.

According to this combination, distances of the first color conversion layer 330R and the second color conversion layer 330G to the color conversion substrate 310 from one of the sides disposed toward the liquid crystal layer 3 may be substantially the same.

Other constituent elements of the lower panel 100 and the color conversion display panel 300, and the liquid crystal layer 3 shown in FIG. 3 may correspond to the same as the constituent elements shown in FIG. 1 and FIG. 2.

A display device according to an exemplary embodiment will now be described with reference to FIG. 4.

Referring to FIG. 4, the display device according to an exemplary embodiment may include a light unit 500 and a display panel 10. The light unit 500 may be disposed on a rear side of the display panel 10.

The display panel 10 includes a lower panel 100, a color conversion display panel 300 facing the lower panel 100 and separated therefrom, and a liquid crystal layer 3 disposed between the lower panel 100 and the color conversion display panel 300.

The color conversion display panel 300 includes a color conversion substrate 310. A light blocking member 220 and a blue light cutting filter 320 may be disposed between the color conversion substrate 310 and the liquid crystal layer 3.

The blue light cutting filter 320 may have the same thickness at a portion overlapping the first color conversion layer 330R and a portion overlapping the second color conversion layer 330G.

A plurality of color conversion layers 330R and 330G may be disposed between the blue light cutting filter 320 and the liquid crystal layer 3, and a transmission layer 330B may be disposed between the color conversion substrate 310 and the liquid crystal layer 3. A plurality of color conversion layers 330R and 330G may respectively include a first color conversion layer 330R and a second color conversion layer 330G, and the first color conversion layer 330R may be a red color conversion layer, while the second color conversion layer 330G may be a green color conversion layer.

The first color conversion layer 330R and the second color conversion layer 330G shown in FIG. 4 may have different thicknesses. Referring to FIG. 4, a thickness ($t_G$) of the second color conversion layer 330G may be greater than a thickness ($t_R$) of the first color conversion layer 330R. However, the present disclosure is not limited thereto. For example, the thickness of one of the first color conversion layer 330R may be greater than the thickness of the second color conversion layer 330G.

One side of each of the first color conversion layer 330R, the second color conversion layer 330G, and the transmission layer 330B disposed toward the liquid crystal layer 3 may have different distances to the color conversion substrate 310 having steps.

A first valley V1 may be disposed between the adjacent first color conversion layer 330R and the second color conversion layer 330G, and a second valley V2 may be disposed between the adjacent second color conversion layer 330G and the transmission layer 330B or between the adjacent first color conversion layer 330R and the transmission layer 330B. In the example shown in FIG. 4, a distance of one side of the second color conversion layer 330G toward the liquid crystal layer 3 from the color conversion substrate 310 in a region between the first valley V1 and the second valley V2 is greater than distances of one side of the first color conversion layer 330R and the transmission layer 330B toward the liquid crystal layer 3 from the color conversion substrate 310. The present disclosure will be described with reference to the one side of the second color conversion layer 330G facing the liquid crystal layer 3. However, it is noted that the present disclosure is not limited thereto.

According to an exemplary embodiment, a first distance d1 between the first color conversion layer 330R and the second color conversion layer 330G may be different from a second distance d2 between the second color conversion layer 330G and the transmission layer 330B or a second distance d2 between the first color conversion layer 330R and the transmission layer 330B. The first distance d1 of the first valley V1 disposed between the first color conversion layer 330R and the second color conversion layer 330G may be greater than the second distance d2 of the second valley V2 disposed between the second color conversion layer 330G and the transmission layer 330B or between the first color conversion layer 330R and the transmission layer 330B.

Further, a first height t1 of the first valley V1 may be greater than a second height t2 of the second valley V2. The first height t1 may be a distance of one side of the first color conversion layer 330R or the second color conversion layer 330G from one side of the light filter layer 340 disposed between the first color conversion layer 330R and the second color conversion layer 330G. The second height t2 is the distance of one side of the transmission layer 330B from one side of the light filter layer 340 disposed between the second color conversion layer 330G and the transmission layer 330B. In this instance, the first height t1 may be less than the second height t2 by the thickness of the blue light cutting filter 320.

According to the sizes of the above-described first valley V1 and the second valley V2, the first valley V1 may be shorter and wider than the second valley V2. The second valley V2 may be taller and narrower than the first valley V1. The volumes of the first valley V1 and the second valley V2 may be substantially the same, and for example, the volume of the first valley V1 may be 90% to 110% the volume of the second valley V2.

According to the distances among the color conversion layers 330R and 330G and the transmission layer 330B, and the heights thereof, the flatness of one side of an overcoat layer 360, particularly one side of the liquid crystal layer 3, may be improved.

Other constituent elements of the color conversion display panel 300 and the liquid crystal layer 3, and the lower panel 100 shown in FIG. 4, may correspond to the same constituent elements shown in FIG. 1 and FIG. 2.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the present disclosure.

What is claimed is:

1. A color conversion display panel comprising
a first color conversion layer and a second color conversion layer disposed on a color conversion substrate and a transmission layer disposed on the color conversion substrate,
wherein each of the first color conversion layer and a second color conversion layer includes semiconductor nanocrystals,
wherein a first distance of a first separation space between a first edge of the first color conversion layer and a second edge of the second color conversion layer that faces the first edge of the first color conversion layer is different from a second distance of a second separation space between a third edge of one of the first and second color conversion layers and a fourth edge of the transmission layer that faces the third edge of the one of the first and second color conversion layers, and
wherein the first separation space does not overlap the first color conversion layer or a second color conversion layer in a plan view, and the second separation space does not overlap the one of the first and second color conversion layers or the transmission layer.

2. The color conversion display panel of claim 1, wherein the second distance is less than the first distance.

3. The color conversion display panel of claim 1, further comprising
a blue light cutting filter disposed between the color conversion substrate and the first color conversion layer, and between the color conversion substrate and the second color conversion layer,
wherein a first portion of the blue light cutting filter overlapping the first color conversion layer is connected to a second portion of the blue light cutting filter overlapping the second color conversion layer.

4. The color conversion display panel of claim 3, wherein a thickness of the first color conversion layer is different from a thickness of the second color conversion layer.

5. The color conversion display panel of claim 4, wherein a thickness of the blue light cutting filter overlapping the first color conversion layer is different from a thickness of the blue light cutting filter overlapping the second color conversion layer.

6. The color conversion display panel of claim 1, wherein the first separation space between the first and second color conversion layers includes a first valley,
the second separation space between one of the first and second color conversion layers and the transmission layer includes a second valley, and
a height of the first valley is less than a height of the second valley.

7. The color conversion display panel of claim 6, wherein a volume of the first valley is 90% to 110% of a volume of the second valley.

8. The color conversion display panel of claim 1, further comprising
a light filter layer covering the first color conversion layer, the second color conversion layer, and the transmission layer.

9. The color conversion display panel of claim 1, further comprising
an overcoat layer covering the first color conversion layer, the second color conversion layer, and the transmission layer, and a polarization layer disposed on the overcoat layer.

10. The color conversion display panel of claim 9, wherein
the polarization layer includes a wire grid polarizer.

11. The color conversion display panel of claim 9, wherein
the overcoat layer includes at least one of acryl-based, polyimide-based, cardo-based, and siloxane-based compounds.

12. The color conversion display panel of claim 1, further comprising
a light blocking member disposed on the color conversion substrate,
wherein a width of the light blocking member is greater than the first distance and the second distance.

13. A display device comprising:
a lower panel; and
a color conversion display panel including a color conversion substrate overlapping the lower panel,
wherein the color conversion display panel includes:
a first color conversion layer and a second color conversion layer disposed between the color conversion substrate and the lower panel and a transmission layer, each of the first color conversion layer and the second color conversion layer including semiconductor nanocrystals,
wherein a first distance of a first separation space between a first edge of the first color conversion layer and a second edge of the second color conversion layer that faces the first edge of the first color conversion layer is different from a second distance of a second separation space between a third edge of one of the first and second color conversion layers and a fourth edge of the transmission layer that faces the third edge of the one of the first and second color conversion layers, and
wherein the first separation space does not overlap the first color conversion layer or a second color conversion layer in a plan view, and the second separation space does not overlap the one of the first and second color conversion layers or the transmission layer.

14. The display device of claim 13, wherein the second distance is less than the first distance.

15. The display device of claim 13, further comprising
a blue light cutting filter disposed between the color conversion substrate and the first color conversion layer, and between the color conversion substrate and the second color conversion layer,
wherein a first portion of the blue light cutting filter overlapping the first color conversion layer is connected to a portion of the blue light cutting filter overlapping the second color conversion layer.

16. The display device of claim 13, wherein
the first separation space between the first and second color conversion layers includes a first valley, and the second separation space between one of the first and second color conversion layers and the neighboring transmission layer includes a second valley, and
a height of the first valley is less than a height of the second valley.

17. The display device of claim 16, wherein
a volume of the first valley is 90% to 110% of a volume of the second valley.

18. The display device of claim 16, wherein
the color conversion display panel further includes a light blocking member disposed between the color conversion substrate and the lower panel, and a width of the light blocking member is greater than the first distance and the second distance.

19. The display device of claim 13, wherein a thickness of the first color conversion layer is different from a thickness of the second color conversion layer.

20. The display device of claim 19, wherein a thickness of the blue light cutting filter overlapping the first color conversion layer is different from a thickness of the blue light cutting filter overlapping the second color conversion layer.

* * * * *